June 12, 1923.
F. D. HARTMAN
GLOBE MAP
Filed July 15, 1922
1,458,762
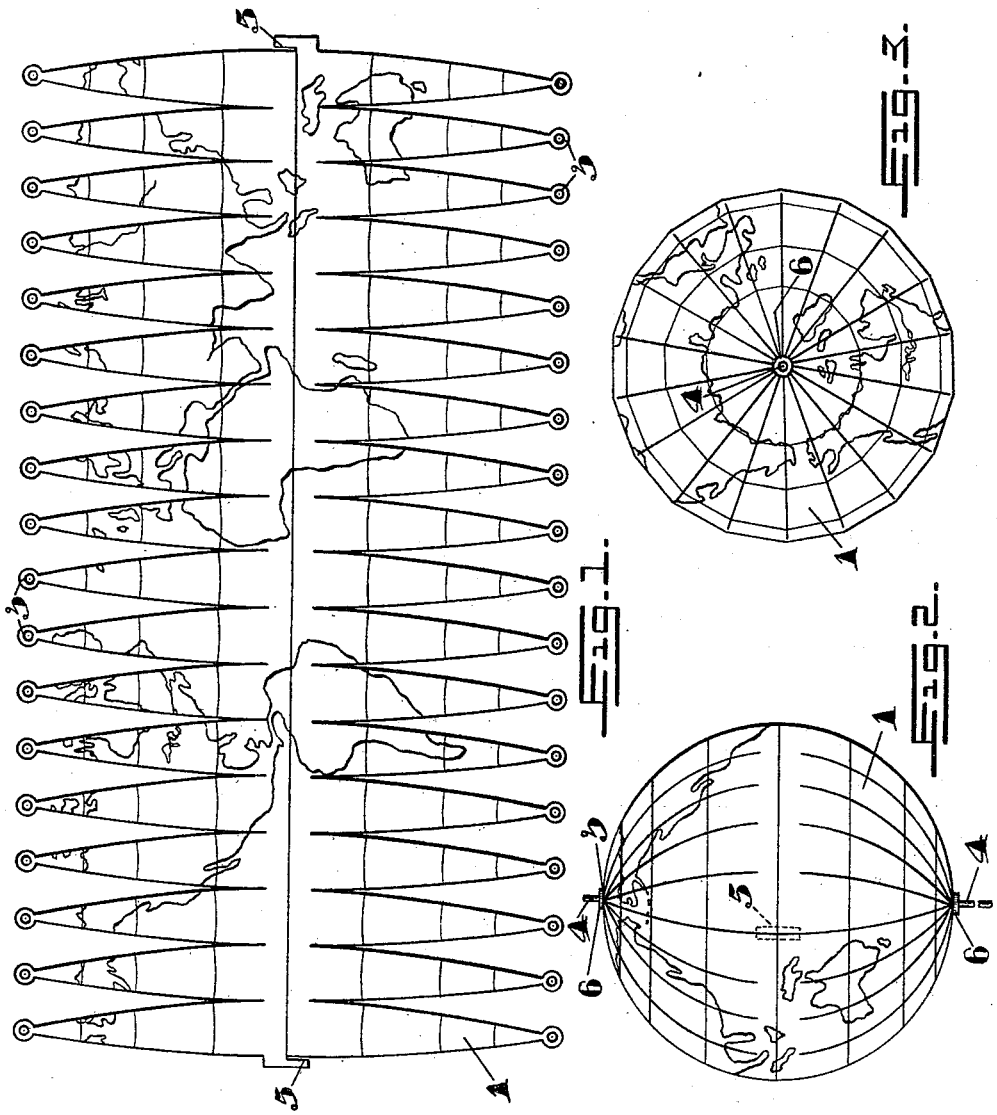
INVENTOR.
F. D. Hartman.
BY J. Edward Maybee.
ATTY.

Patented June 12, 1923.

1,458,762

UNITED STATES PATENT OFFICE.

FREDERICK D. HARTMAN, OF TORONTO, ONTARIO, CANADA, ASSIGNOR TO THE GEOPLANUS COMPANY, LIMITED, OF TORONTO, ONTARIO, CANADA, A CORPORATION OF ONTARIO.

GLOBE MAP.

Application filed July 15, 1922. Serial No. 575,385.

*To all whom it may concern:*

Be it known that I, FREDERICK D. HARTMAN, of the city of Toronto, in the county of York, Province of Ontario, Canada, a citizen of the United States of America, have invented certain new and useful Improvements in Globe Maps, of which the following is a specification.

Up to this time the expense incident to the construction of a globe and the imprinting of the map thereon has rendered it financially impracticable to place in the hands of students or teachers of geography globes properly and accurately representing the celestial sphere, or the earth's surface.

It has heretofore been proposed, as a substitute for the ordinary globe, to produce flat maps which could be set up to represent a globe, but as far as I am aware such maps have not been satisfactory, either because they could not be formed from an integral sheet of material, did not approximate closely enough to a true sphere when set up or were too expensive to produce, and my object is to devise a construction of globe map which will overcome these obstacles to success and which may be either sent out in the flat form to be assembled by the purchaser, or sold in the set up form.

I attain my object by means of the constructions hereafter described and illustrated in the accompanying drawings in which—

Fig. 1 is a plan view of a map in its flat condition;

Fig. 2 a side elevation of the globe; and

Fig. 3 a plan view of the same.

In the drawing like numerals of reference represent corresponding parts in the different figures.

The map may be formed of paper of a suitable stiffness or some such material as tracing linen or linaura fabric, or of other and stronger materials, the material used being dependent upon the durability desired, the use to which the globe is to be put, or other requirements. The material is employed in the form of an integral sheet and is cut to form a series of lunes I integrally united at the equatorial belt of the map. The number of lunes may be varied, it being apparent that they must be sufficient in number, however, to give the equatorial belt an approximately circular form when its ends are joined. In practice I have found 18 to be a satisfactory number. The sides of the lunes are shaped so that when the globe is set up the edges contact on meridian lines, and that these lines are approximately true circles. In order that the lunes should contact and give substantially the appearance of a true sphere, it is necessary that the width of any portion of a lune should be the chord of an arc of the corresponding parallel of latitude which subtends an angle represented by 360° divided by the number of lunes; that is in the present case 20°. The shape of the lunes will therefore vary as their number, and their dimensions as the size of the globe to be produced.

The ends of the lunes and that part of the map which forms the equatorial belt may be joined in any suitable manner. The equatorial belt may be joined by notched tabs 5, which are adapted to interlock as indicated in dotted lines in Fig. 2. The ends of the lunes are provided with apertured tabs 3, through which may be passed a slender rod 4, which will form the axis of the globe. The axis 4 may be provided with two or more collars 6, one of which may be permanent while the rest have a friction tight fit on the axis so that they tend to maintain their positions thereon.

It is, of course, impossible to produce a true sphere from flat material unless it is possible to stretch or distort the same from the flat which cannot be done by the simple bending of the parts which takes place in the operations just described, but I do find it possible by constructing the flat map and setting it up as described to produce a hollow globe having its meridians approximately circular and its parallels of latitude polygonal, the sides being sufficiently numerous to produce a substantially circular effect.

It is evident that a flat map constructed as above described and which may include as much detail as may be desirable can be made by present lithographic or other processes with the greatest accuracy and at a minimum of expense, and this fact, together with the possibility of sending and distributing the maps in flat form for assembling by the student or purchaser, renders it possible to put in the hands of the public a sufficiently perfect globe map showing the proper relationships of all parts of the world or of the celestial sphere at a cost very much below anything heretofore accomplished.

It is evident also that if desired the flat map may be pasted on a globe in which case the paper will stretch sufficiently to enable it to lie smoothly on the spherical surface.

What I claim as my invention is:—

1. A map formed of a flat sheet cut to form a plurality of lunes integrally connected at the equatorial belt of the map, the ends of the lunes being provided with apertured tabs for the passage of an axis, the said lunes being sufficient in number to give the equatorial belt a substantially circular form when its ends are joined, and the sides of the lunes being shaped to contact on meridian lines, which are substantially circular.

2. A map constructed as set forth in claim 1 provided with tabs adapted to interlock to join the ends of the equatorial belt.

3. A hollow globe formed of a plurality of lunes of flexible material connected only at the poles and adjacent the equator, said globe having its meridians approximately circular and its parallels of latitude polygonal, the lunes being sufficient in number to give a substantially circular effect to said parallels.

Signed at Toronto, Ontario, this 13th day of June, 1922.

FREDERICK D. HARTMAN.